Dec. 14, 1937.        O. WÜNSCHE        2,102,400
CONTROLLER APPARATUS
Filed Jan. 9, 1935
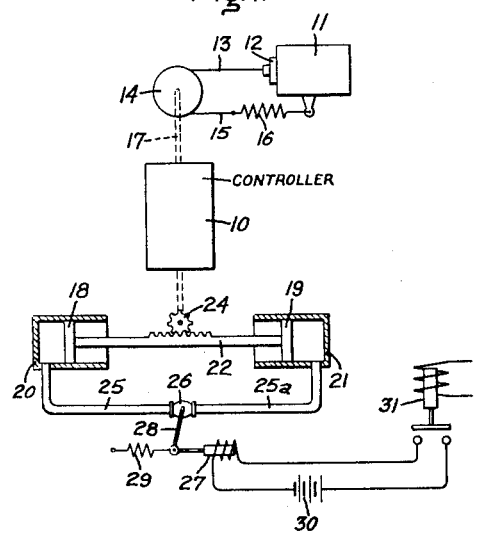
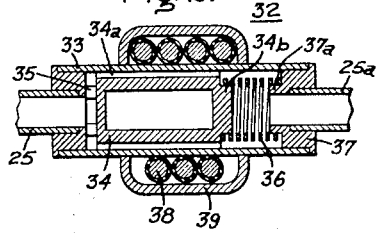
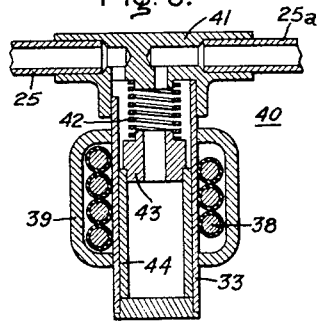
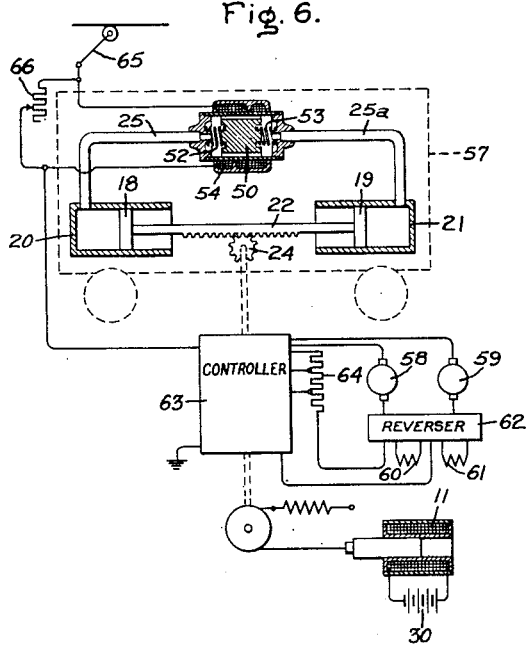
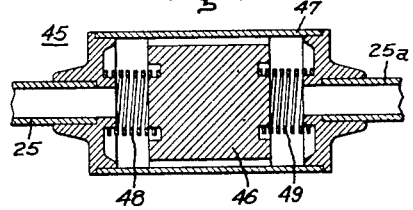
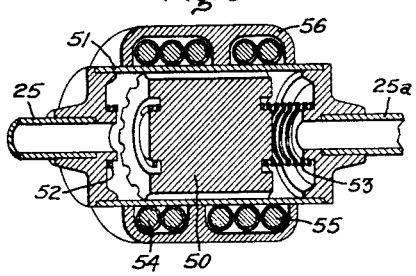
Inventor:
Otto Wünsche,
by Harry E. Dunham
His Attorney.

Patented Dec. 14, 1937

2,102,400

UNITED STATES PATENT OFFICE 2,102,400

CONTROLLER APPARATUS

Otto Wünsche, Berlin-Friedenau, Germany, assignor to General Electric Company, a corporation of New York Application January 9, 1935, Serial No. 1,044
In Germany January 29, 1934

12 Claims. (Cl. 175—355)

My invention relates to controller apparatus of the type arranged to control the acceleration of electrically driven vehicles, and has for an object the provision of a simple, reliable and inexpensive device of this character.

Heretofore the motor torque and the acceleration of vehicles have been maintained at predetermined values by suitably controlling the motor current as by series resistance. In automatically controlled vehicles, such for example as the one shown in Tritle Patent No. 1,382,872, a controller is arranged to decrease the series resistance a fixed amount whenever the motor current drops to a predetermined value. The current is thereby regulated so that a substantially constant torque is produced by the driving motors. It has further been proposed to control the acceleration of the vehicle or car irrespective of the load on the car, such a system being shown and claimed in my Patent No. 1,919,996. While the systems described in the aforementioned patents are entirely satisfactory something is yet to be desired in procuring a more uniform control of the acceleration.

It is, therefore, a further object of my invention to provide controller apparatus which is responsive both to motor current and to the rate of acceleration of the vehicle.

For a more complete understanding of my invention, reference should now be had to the drawing in which I have shown in Fig. 1 a controller of the type to which my invention is readily applicable; Fig. 2 is a sectional elevation of one form of a device embodying my invention; Figs. 3 and 4 are sectional elevations of modifications of my invention; Fig. 5 is a perspective view, partly in section of a further modified form of my invention while Fig. 6 illustrates diagrammatically the device of Fig. 5 applied to a vehicle control system.

Referring to the drawing, I have shown my invention in one form as applied to hydraulic controller operating mechanism such as shown in Fig. 1. A controller 10 is arranged to be rotated from an off position through a plurality of motor accelerating positions. While other forms of operating means can be employed to rotate the controller, I have shown for this purpose a solenoid 11 provided with a slidable plunger 12. The sliding movement of the plunger rotates the controller by means of a belt 13 secured at one end to the plunger 12, threaded over a pulley 14, and secured at its opposite end 15 to a coil spring 16. The pulley 14 is rigidly secured to the controller shaft 17.

During normal motoring operations the solenoid 11 is constantly energized to move the plunger 12, the belt 13 acting on the pulley 14 to rotate the controller 10 in a clockwise direction through a plurality of accelerating positions. In order to control the angular speed of the controller 10 there are provided two pistons 18 and 19 mounted respectively in cylinders 20 and 21, the pistons 18 and 19 being rigidly secured together by means of a rack gear 22. The pistons are simultaneously moved in response to rotation of the controller 10 by means of a gear 24 secured to the controller shaft 17 and arranged in meshing relation with the rack gear 22. The two cylinders 20 and 21 are interconnected by means of pipes or conduits 25 and 25a and a regulating valve 26. The cylinders and conduits are filled with a damping fluid, for example, oil, so that a transfer of the damping fluid from one cylinder to the other occurs as the controller is rotated, the speed of rotation of the controller being determined by the position of the valve 26. When the valve is fully open the speed is greatest; when fully closed the controller remains at standstill. As shown in Fig. 1, the valve is operated, by means of a solenoid 27 connected to a valve arm 28, from a closed position to an open position against the opposing force exerted by a tension spring 29. The energization of the solenoid 27 from a source of supply indicated by the battery 30 is controlled by an accelerating relay 31 responsive to the motor current. When the motor current is below a predetermined amount the accelerating relay 31 closes its contacts to energize the solenoid 27 to open the regulating valve 26. As soon as the controller moves to the next accelerating position to exclude resistance from the motor circuit the current immediately rises. If the motor current exceeds a predetermined amount the accelerating relay 31 operates to open its contacts to deenergize the solenoid 27. The tension spring 29 thereupon operates the regulating valve 26 to its closed position thereby preventing further advance of the controller.

In accordance with my invention I provide an improved retardation device for the controller 10 which device is connected in and forms a part of the fluid circulatory system formed by the conduits 25 and 25a, preferably in place of the valve 26. Referring now to Fig. 2, it will be observed that my retardation device 32 is provided with a non-magnetizable casing 33, the respective ends of which are connected to the conduits 25 and 25a. The damping fluid flows from the conduit 25 within the casing 33 and around the outside of a hollow plunger 34 formed of magnetizable material, such for example as iron. Preferably slots or grooves 34a are provided in the plunger for the flow of the fluid. The plunger 34 is normally biased against stationary stops 35 by means of a coil spring 36, each turn of which is flattened in a radial direction. Normally spaces of a predetermined size are provided between the turns of the spring. One end of the spring 36 is mounted on an extension 34b of the plunger while the other end of the spring is mounted on an extension 37a of a bushing 37. The flow of fluid from the outside of the plunger to the conduit 25a is through the spaces of the spring. Surrounding the casing 33 and the plunger 34 is a coil 38 responsive to the motor current for operating the plunger 34 in a direction to compress the spring 36. The magnetic attractive effort produced by the coil on the plunger 34 is increased by the provision of a magnetizable member 39, preferably made of magnet core iron, which forms a casing for the coil.

The arrangement is such that all of the damping fluid must flow through the spaces between the turns of the coil spring. Therefore compression of the coil spring by the plunger 34 decreases gradually and continuously, the size of the spaces, the flow of the damping fluid from one cylinder to the other being correspondingly decreased. A corresponding decrease in the speed of rotation of the controller 10 is thereby effected. By suitably adjusting the tension of the spring 36 or by varying the attractive effort developed by the coil 38 on the plunger 34, it will be apparent that the device 32 can so control the speed of the controller 10 as to maintain the motor current substantially constant. The device 32 is peculiarly well adapted to a fluid circulatory system since the frictional resistance of the plunger 34 is a minimum whereas in valves of the type hitherto used the frictional resistance has under the same motor current conditions caused great variations in the operation of the valves.

Referring to Fig. 1, when the solenoid 11 is deenergized the spring 16 will tend to rotate the controller 10 in a counterclockwise direction towards its off position. The device 32 as soon as the current in the coil 38 drops below a predetermined value permits the return of the controller to its off position, the damping fluid flowing from the cylinder 21 through the spaces between the turns of the spring 36 and to the cylinder 20.

The device 40 illustrated in Fig. 3 operates in response to motor current in a manner similar to the device 32. In this case, however, the casing 33 is connected in the circulatory system by means of a T-connector 41, the flow of the damping fluid being controlled by a vertically mounted spiral spring 42, one end of which is supported by the T-connector and the other end of which bears against a hollow plunger 43. The plunger is operated from a position against a stop 44 to compress and close the interstices of the spring by means of the coil 38.

Instead of depending upon the magnetic attraction to move an iron member to control the flow of the damping fluid, the device 45 illustrated in Fig. 4 controls the advance of the controller 10 in response to the acceleration of the vehicle, the operation of the device 45 therefore being independent of the load on the vehicle. In this modification of my invention an inertia plunger 46 of substantial size and considerable weight is slidably mounted in a casing 47 to which is secured at its opposite ends the conduits 25 and 25a. The plunger and casing are mounted horizontally in the vehicle and in the direction of travel, the compression springs 48 and 49 being located respectively between the ends of the casing and the plunger. The damping fluid can flow from the conduit 25 through the turns of the spring 48, around the plunger 46, between the turns of the spring 49 and to the conduit 25a.

As the vehicle is accelerated at a predetermined rate in a right-hand direction, as viewed in Fig. 4, the heavy plunger 46 due to its inertia acts upon the spring 48 to compress it and thereby to decrease the flow of damping fluid from one cylinder to the other. When the vehicle is accelerated to the left, as viewed in Fig. 4, the plunger 46 acts upon the spring 49 to control the flow of the damping fluid and the speed of movement of controller 10 so as to maintain a substantially constant rate of acceleration for the vehicle. Furthermore the rate of acceleration of the vehicle is maintained substantially constant for either forward or reverse travel of the vehicle. Broadly considered, the springs 48 and 49 can be replaced by valves of any suitable type adapted to be operated by the plunger 46.

In accordance with a further modification of my invention, as illustrated in Fig. 5, a relatively heavy inertia plunger 50 mounted within a casing 51 is formed of iron or a similar magnetizable material. The plunger 50, in response to the acceleration of the vehicle, acts against one or the other of compression springs 52 and 53 to control the flow of the damping fluid. By providing a current responsive coil 54, as shown surrounding the left-hand end of the plunger 50, the movement of the plunger 50, due to the accelerating force, is modified in response to the motor current. The location of the coil 54 with respect to the plunger 50 in the direction of movement of the plunger determines whether the plunger is assisted or retarded in its movement. If it is retarded during the forward acceleration the coil will of course assist the plunger for reverse operation. Although the coil 54 is responsive to the motor current, the magnitude of the magnetic attractive force it produces may be adjusted to a relatively small value, so that the primary factor in controlling the advance of the controller 10 will be the movement of the plunger 50 in response to the rate of the acceleration of the vehicle. Furthermore by means of an additional coil 55, the plunger 50 can be assisted or opposed as may be desired. As before, a magnetizable member assists the coils by concentrating at a desired point with respect to the plunger 50 the magnetic flux produced by the coil.

Referring to Fig. 6, the device illustrated in Fig. 5 is mounted upon a vehicle 57 which is driven by traction motors 58 and 59 provided respectively with series field windings 60 and 61, the polarity of the field windings being controlled by means of a reverser 62. The connections of the motors 58 and 59 are determined by means of a controller 63 which also serves to vary the sections of a resistor 64 which are included in the motor circuit. The coil 54 is connected in series with the trolley 65 and is therefore responsive to the motor current. The magnitude of the attractive effort produced by the coil 54 on the plunger 50 is determined by the setting of a variable resistance 66 connected in shunt circuit relation with the coil 54. The controller 63 is rotated from an off position through a plurality of accelerating positions by means of the solenoid 11 energized from its suitable source of supply 30.

If the car 57 is moved in the right-hand direction, as viewed in Fig. 6, the plunger 50 will serve to compress the spring 52 an amount proportional to the rate of acceleration. The coil 54 acts on the plunger 50 in a direction to assist the plunger in compressing the spring 52. With this arrangement the resistance 66 is adjusted so that the coil 54 overcomes any frictional resistance to movement of the plunger 50. The result is a control device which is much more accurate in reflecting changes in the acceleration of the car 57; therefore the control of the damping fluid is much more accurate and the controller 63 therefore maintains the rate of acceleration constant.

Obviously, if the coil 55 were connected in series with the motor circuit, it would act to oppose this movement due to the rate of acceleration in the right-hand direction. The controller would then operate to maintain a higher value of motor current and a higher rate of acceleration. In either case the coils 54 and 55 may be connected in or excluded from the motor circuit to secure predetermined rates of acceleration in one direction or the other.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In combination a circuit controller operable through a plurality of circuit controlling positions for controlling a driven device, operating means therefor, retarding means for said controller comprising cylinder means for a damping fluid, a conduit connected to said cylinder means, piston means slidably mounted within said cylinder means and operable by said controller to move said fluid through said conduit, a coil spring, means mounting said coil spring in the path of said fluid, the flow of said fluid being through the spaces between the turns of said spring, and means responsive to a condition of operation of the driven device and including a plunger for compressing said spring to control the speed of movement of said piston means and said controller.

2. In combination a circuit controller operable through a plurality of circuit controlling positions for controlling a device, operating means for operating said controller through said positions at a predetermined speed, retarding means for said controller comprising a cylinder means for a damping fluid, a conduit connected to said cylinder means, piston means slidably mounted in said cylinder means, rigid means operable by said controller for moving said piston means in said cylinder means, a coil spring having a plurality of turns with spaces of a predetermined size between each turn, means mounting said spring with respect to said conduit so that the flow of said fluid from said cylinder means is through said spaces of said spring, and means responsive to a condition of operation of the driven device for compressing said spring to decrease the size of said spaces and thereby limit the speed of movement of said piston means and said controller.

3. In combination a circuit controller operable through a plurality of circuit controlling positions, operating means for operating said controller through said positions at a predetermined speed, retarding means for said controller comprising cylinder means for a damping fluid, a conduit connected to said cylinder means, piston means slidably mounted in said cylinder means and operable by said controller to force said fluid through said conduit, a coil spring having a plurality of turns with spaces of a predetermined size between each turn, means mounting said spring with respect to said conduit for the flow of fluid between the spaces of said spring, and current responsive means for compressing said spring to decrease the size of said spaces and to limit thereby the speed of movement of said piston means and said controller.

4. In combination a circuit controller operable through a plurality of circuit controlling positions, operating means for operating said controller in either direction through said positions at a predetermined speed, retarding means for said controller comprising cylinders filled with a damping fluid, a conduit interconnecting said cylinders, a piston mounted in each of said cylinders, a mechanical connection between said pistons and said controller for operating said pistons to transfer said damping fluid from one cylinder to the other, a coil spring having a plurality of turns with spaces of a predetermined size between each turn, means mounting said spring with respect to said conduit to cause said fluid to flow through the spaces between the turns of said spring, and current responsive means for compressing said spring to decrease the size of said spaces to limit the speed of movement of said pistons and said controller.

5. In combination a circuit controller operable through a plurality of circuit controlling positions for controlling a driven device, operating means for operating said controller through said positions at a predetermined speed, retarding means for said controller comprising cylinder means filled with a damping fluid, a conduit connected to said cylinder means, piston means slidably mounted in said cylinder means, a mechanical connection between said controller and said piston means for operating said piston means to force said fluid through said conduit, a casing arranged to receive fluid from said conduit, a plunger mounted within said casing, a coil spring having a plurality of turns with spaces of a predetermined size between each turn mounted within said casing, one end of said spring bearing against said plunger and the other end of said spring bearing against an end of said casing, said plunger being formed to permit the flow of said fluid only through said spaces of said spring, and means responsive to a condition of operation of the driven device for operating said plunger to compress said spring to limit thereby the speed of movement of said controller.

6. In combination a circuit controller operable through a plurality of circuit controlling positions for controlling the rate of acceleration of a vehicle, operating means for operating said controller through said positions at a predetermined speed, retarding means for said controller comprising cylinder means filled with a damping fluid, a conduit connected to said cylinder means, piston means slidably mounted in said cylinder means, a mechanical connection between said controller and said piston means for moving said piston means in a direction to force fluid from said cylinder means through said conduit, a coil spring having a plurality of turns with spaces of a predetermined size between each turn, means mounting said spring with respect to said conduit to form a fluid path through the spaces of said spring, a casing for said spring, a relatively heavy plunger operable in response to the rate of acceleration for compressing said spring to limit the speed of movement of said controller so as to maintain substantially constant said rate of acceleration.

7. In combination a circuit controller operable through a plurality of circuit controlling positions for controlling the rate of acceleration of a vehicle, operating means for operating said controller through said positions at a predetermined speed, retarding means for said controller comprising cylinder means filled with a damping fluid, a conduit connected to said cylinder means, piston means slidably mounted in said cylinder means, means operable by said controller for moving said piston means in a direction to transfer said fluid from said cylinder means to said conduit, a coil spring having a plurality of turns with spaces of a predetermined size between each turn, means mounting said spring with respect to said conduit to form a fluid path through said spaces of said spring, and means responsive to the rate of acceleration of said vehicle for compressing said spring to limit the speed of movement of said controller so that a substantially constant rate of acceleration of said vehicle is maintained by said controller.

8. In combination a circuit controller operable through a plurality of circuit controlling positions for controlling the rate of acceleration of a vehicle, operating means for operating said controller in either direction through said positions at a predetermined speed, motor means controlled by said controller for producing a predetermined rate of acceleration, retarding means for said controller comprising a pair of cylinders filled with a damping fluid, a conduit interconnecting said cylinders, a piston slidably mounted in each of said cylinders, mechanical means operable by said controller for moving said pistons to transfer fluid from one to the other of said cylinders, a pair of coil springs each having a plurality of turns with spaces of a predetermined size between each turn, a plunger mounted between said springs, means mounting said springs and said plunger with respect to said conduit to form a fluid path for said fluid through the spaces between the turns of said springs, and means for compressing one or the other of said springs to control the size of said spaces to limit the speed of movement of said pistons and said controller in said one direction or the other.

9. Retarding means for a controller operable to control a driven device comprising a fluid circulatory system, means operable by the controller for moving fluid through said system in accordance with the speed of the controller, a valve for controlling the rate of flow of said fluid to thereby control the speed of the controller comprising a coil spring having a plurality of turns with spaces of a predetermined size for the flow of said fluid between each turn, and means responsive to a condition of operation of the driven device for compressing said spring to decrease the size of said spaces.

10. Retarding means including a damping fluid operable through a fluid circulatory system comprising a casing connected in said system, a plunger dividing said casing into two parts, a coil spring for the respective ends of said plunger for centering said plunger in said casing, each of said springs having a plurality of turns with spaces of a predetermined size between each turn, said spaces providing for the flow of said damping fluid therebetween, and means for operating said plunger in one direction or the other to control the flow of said damping fluid in one direction or the other.

11. In combination a circuit controller operable through a plurality of circuit controlling positions, operating means for operating said controller in either direction through said positions at a predetermined speed, retarding means for said controller comprising a plurality of cylinders filled with a damping fluid, a conduit connected to said cylinders, pistons slidably mounted in said cylinders, means operable by said controller for moving said pistons in one direction or the other in said cylinders, a casing connected to said conduit and forming a fluid passageway for said conduit, a pair of valves located in said casing, operating means for said valves responsive to a condition of operation for operating one valve to restrict the flow of said damping fluid in one direction and for operating said other valve to restrict the flow of said damping fluid in the other direction.

12. In combination with an electrically operated vehicle, motor means for driving said vehicle, speed control means operable through a plurality of steps for accelerating said motor, damping means for controlling said speed control means comprising a fluid circulatory system, a plunger mounted in said system and surrounded on all sides by said damping fluid, means for moving said plunger and means responsive to movement of said plunger for decreasing the flow of damping fluid to control the acceleration of said vehicle.

OTTO WÜNSCHE.